United States Patent [19]

Dell

[11] 4,400,849
[45] Aug. 30, 1983

[54] SHRIMP PEELING UNIT

[76] Inventor: Travis E. Dell, Rte. 7, Box 4390, Plant City, Fla. 33566

[21] Appl. No.: 344,804

[22] Filed: Jan. 28, 1982

[51] Int. Cl.³ .............................................. A22C 29/02
[52] U.S. Cl. ........................................... 17/72; 17/73
[58] Field of Search ......................... 17/72, 73, 51, 48

[56] References Cited

U.S. PATENT DOCUMENTS

| 3,070,833 | 1/1963 | Skrmetta | 17/73 X |
| 3,634,909 | 1/1972 | Matthiesen | 17/73 |

FOREIGN PATENT DOCUMENTS 247915  7/1963  Australia ................................. 17/73

Primary Examiner—Willie G. Abercrombie
Attorney, Agent, or Firm—Harvey B. Jacobson

[57] ABSTRACT

A pair of journaled generally horizontal and parallel side-by-side rollers are provided including at least closely adjacent sides defining an elongated upwardly opening "nip" area therebetween. Structure is provided for supplying successive shrimp to be peeled to one end of the "nip" area and drive structure is operatively connected to the rollers for inversely oscillating the latter. The drive structure includes adjustment features operative to adjust the angular extent of oscillation of the rollers, the phase change speed of oscillation of the rollers and the cycle frequency of oscillation of the rollers. Further, a row of fingers are mounted for adjustable speed movement along the "nip" area and are engageable with the shrimp within the "nip" area for urging the shrimp therealong and spray heads are arranged along the "nip" area for directing spray jets of liquid into the "nip" area for assisting in the removal of the shells of the shrimp and also the cleaning of the shrimp being peeled or shelled.

10 Claims, 5 Drawing Figures

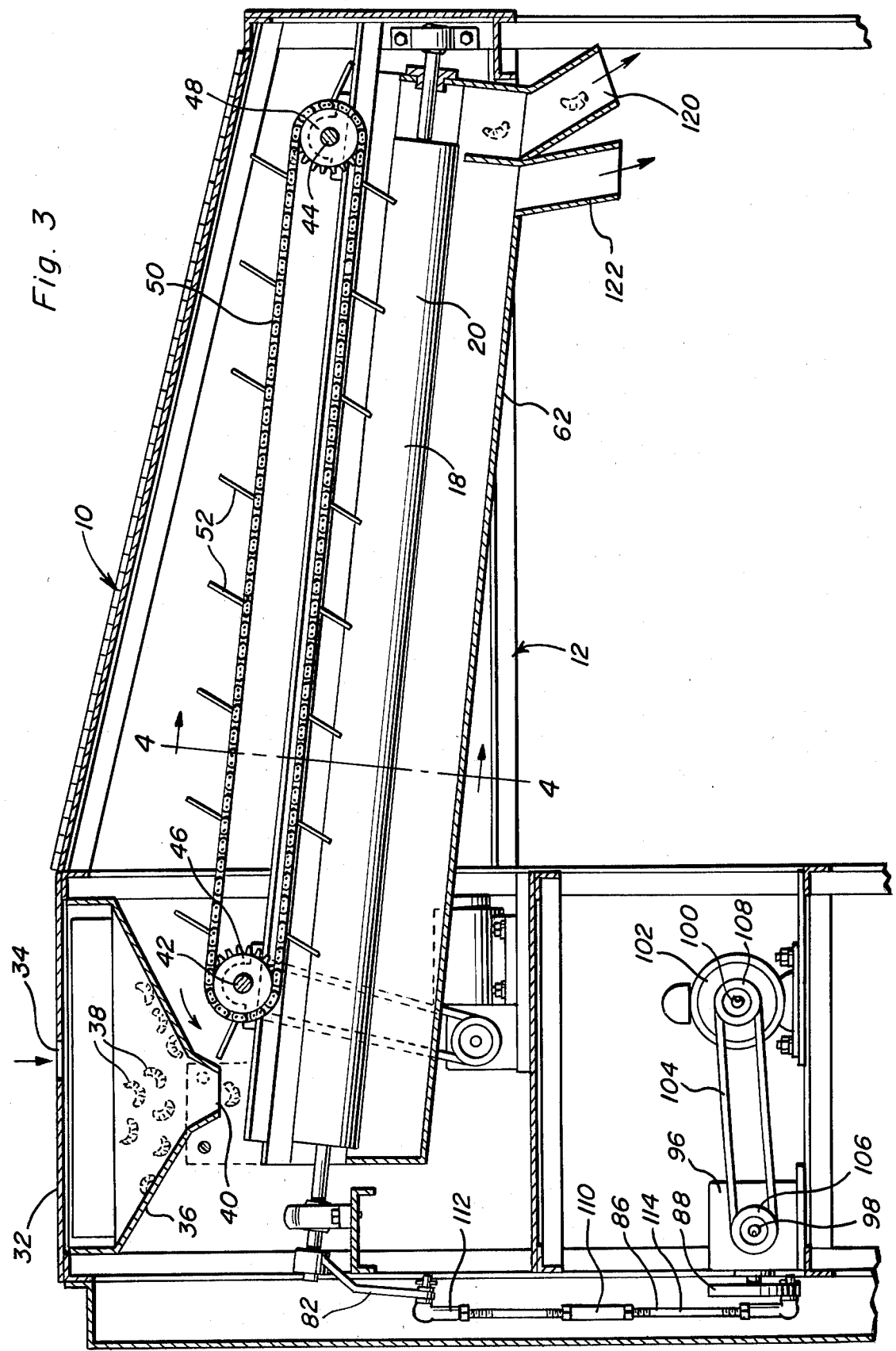

4,400,849

SHRIMP PEELING UNIT

BACKGROUND OF THE INVENTION

Various forms of shrimp peeling machines heretofore have been provided including those disclosed in U.S. Pat. Nos. 2,858,563, 2,976,564, 3,070,833, 3,276,878 and Re. 26,971.

However, many previously known shrimp peeling machines include structural and operational features which adapt them, primarily, for peeling specific types of shrimp. However, a shrimp processing plant frequently must process numerous different kinds of shrimp having thin or thick shells and shrimp whose meat may vary in firmness. The firmness of the meat of shrimp depends not only on the type of shrimp and the location in which the shrimp is caught, but also the time interval between the time the shrimp is caught and the time the shrimp is processed.

Accordingly, a need exists for a shrimp peeling machine which will be capable of effectively peeling both thin and thick shell shrimp and thin or thick sheel shrimp whose meat is either firm or soft.

In addition, many previously known forms of shrimp peeling apparatus are specifically designed for peeling shrimp whose sizes vary from 100 count to 300 count and shrimp which fall in this category (small) is not required under Government specifications to be deveined. Therefore, in order to assist in the peeling and deveining of shrimp larger than 100 count shrimp (75% of which is being processed by hand), an even greater need exists for a shrimp peeling machine which may be utilized to peel shrimp that has already been split down the back. In this manner, not only may the shrimp be peeled, but the peeled shrimp may also be deveined.

BRIEF DESCRIPTION OF THE INVENTION

The shrimp peeling machine of the instant invention utilizes a pair of generally horizontal, but slightly inclined, side-by-side contacting rollers which together define an upwardly opening "nip" area in which to receive shrimp to be peeled and deveined. The shrimp are fed to one end of the "nip" area and drive structure is drivingly connected to at least one of the rollers for inversely oscillating the rollers. The drive structure includes means operative to adjust the angular extent of oscillation of the rollers, means to adjust the phase change speed of oscillation of the rollers and means operative to adjust the cycle frequency of oscillation. In addition, the peeling machine further includes motor driven fingers which engage the shrimp in the aforementioned "nip" area to urge the shrimp longitudinally therealong and water spray jets are spaced along the "nip" area for directing spray jets of water onto the shrimp being peeled not only to facilitate removal of the shell of the shrimp, but also to effectively devein the shrimp.

The main object of this invention is to provide a shrimp peeling machine which will be adaptable to peeling the shell from various types of shrimp including those having thin and thick shells and those having firm and soft meat.

Another object of this invention is to provide a shrimp peeling apparatus specifically designed for use in conjunction with shrimp which has been slit down the back.

A further object of this invention is to provide a shrimp peeling machine which will be additionally operative to effectively devein the shrimp being peeled.

Yet another important object of this invention is to provide a shrimp peeling apparatus including sucessive water jets for spraying the shrimp being cleaned throughout successive stages of the peeling operation and with the water jets not only facilitating the peeling operation, but also effecting the deveining operation.

Another object of this invention is to provide a shrimp peeling machine including adjustment features thereof which may tailor the shrimp peeling operation of the machine on shrimp being processed thereby to a particular type of shrimp whether it includes a thick or thin shell or firm or soft body meat.

A final object of this invention to be specifically enumerated herein is to provide a shrimp peeling apparatus in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged longitudinal vertical sectional view taken substantially upon the plane indicated by the section line 3—3 of FIG. 1;

DETAILED DESCRIPTION OF THE INVENTION

Figure 1:
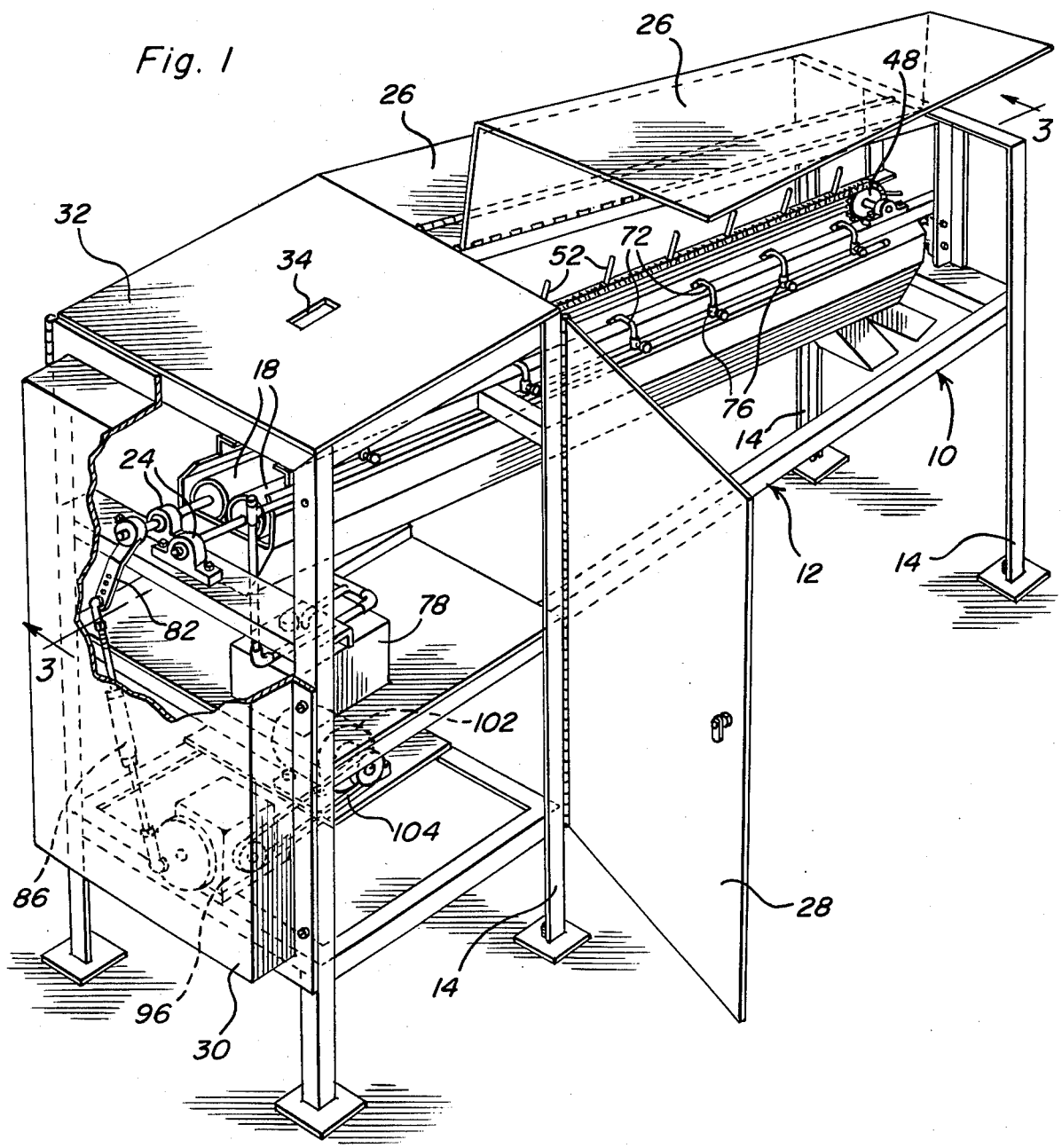
FIG. 1 is a perspective view of the shrimp peeling machine of the instant invention.
Figure 5:
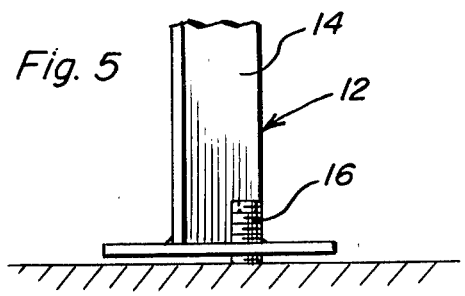
FIG. 5 is a fragmentary elevational view illustrating one of the adjustable feet of the shrimp peeling machine.

Referring now more specifically to the drawings, the numeral 10 generally designates the shrimp peeling unit of the instant invention. The unit 10 includes a suitable supporting framework referred to in general by the reference numeral 12 and having a plurality of depending supporting legs 14 each including a vertically adjustable threaded foot portion 16 supported therefrom. Accordingly, the frmework 12 may be suitably leveled when supported from an uneven floor surface, or the like.

Figure 4:
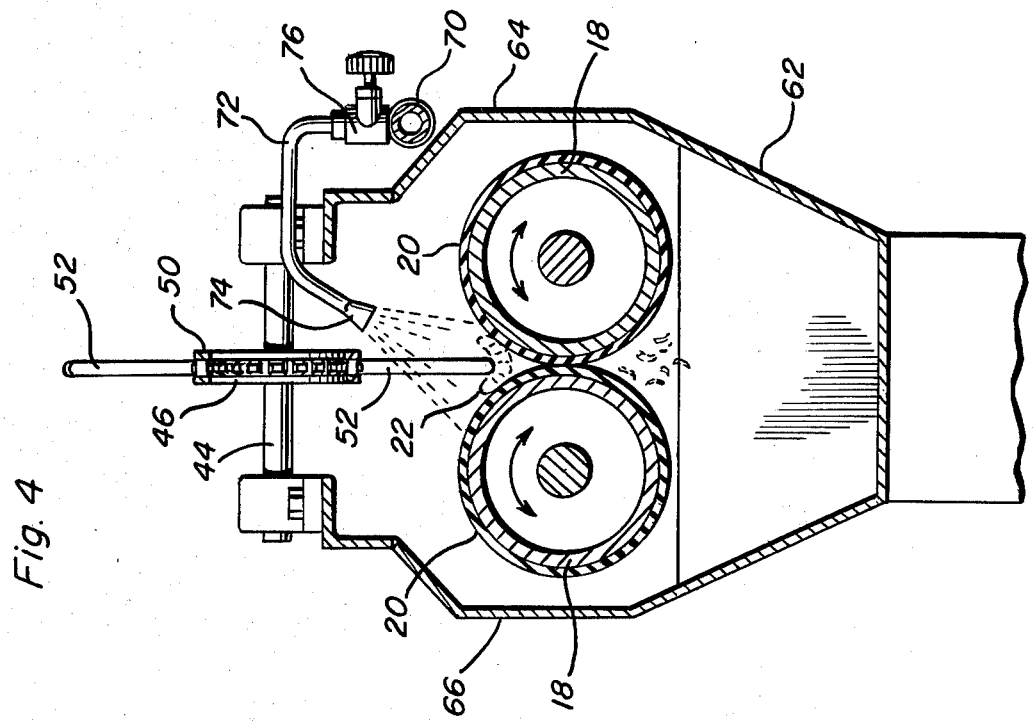
FIG. 4 is a further enlarged transverse vertical sectional view taken substantially upon the plane indicated by the section line 4—4 of FIG. 3.

The unit 10 includes a pair of generally horizontal, side-by-side rollers 18 journaled therefrom and the rollers 18 include resilient outer coverings 20 and define an upwardly opening "nip" area 22 between the upper sides thereof adjacent the areas of contact between the coatings 20, see FIG. 4.

The rollers 18 are suitably journaled from the framework 12 through the utilization of journal blocks 24 and the rollers are slightly inclined as may best be seen from FIG. 3 of the drawings, and the framework 12 includes a cabinet structure supported therefrom including a pair of hinged combined top and side panels 26, a horizontally swingable side door 28 and a horizontally swingable end door 30.

The cabinet structure additionally includes a stationary top wall 32 having an entrance slot 34 formed therethrough and a funnel structure 36 (see FIG. 3) is disposed beneath the top wall 32 in alignment with the entrance slot 34 and serves to funnel shrimp 38 passing through the slot 34 to a discharge opening 40 of the funnel 36 immediately above the inlet or elevated end of the aforementioned "nip" area 22.

A pair of opposite end transverse shafts 42 and 44 are journaled above the upper and lower ends of the rollers 18 and include sprocket wheels 46 and 48 mounted thereon. A link chain 50 is trained about the sprocket wheels 46 and 48 and supports longitudinally spaced outwardly projecting inclined spring fingers 52 therefrom at points spaced longitudinally therealong. The shaft 42 includes a driven pulley 54 supported therefrom aligned with the output pulley 56 of a variable speed gear motor 58. An endless flexible belt 60 is trained about the pulleys 54 and 56 and drivingly connects the former to the latter. The spring fingers 52 are centered relative to the "nip" area 22 and extend reasonably far down into the "nip" area 22.

Figure 2:
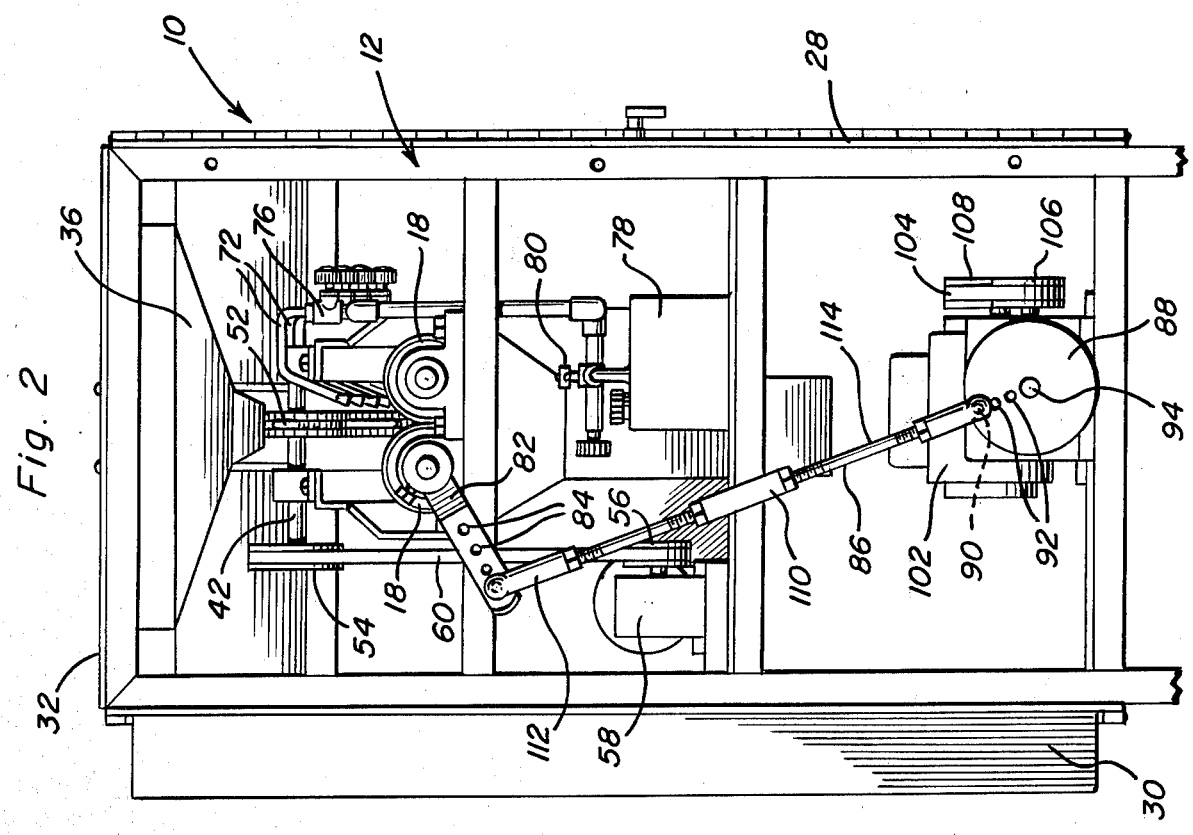
FIG. 2 is an end elevational view of the apparatus as seen from the left hand side of FIG. 1 and with the near side cover in the open position.

A trough 62 underlies and extends along the rollers 18 and includes upwardly projecting sides 64 and 66 which extend along remote sides of the rollers 18. In addition, one side of the upper portion of the trough 62 has a water manifold line 70 supported therefrom and extending therealong and the water manifold line 70 includes a plurality of lateral feed lines 72 terminating in downwardly directed jet spray heads 74 and having flow control valves 76 serially connected therein. The manifold line receives a supply of cleaning fluid from a suitable source 78 thereof under pressure and under the control of an adjustable throttle valve 80, see FIG. 2.

One of the rollers 18 includes a crank arm 82 mounted on its upper end and the crank arm 82 includes a plurality of longitudinally spaced bores 84 formed therethrough. One end of an elongated connecting rod 86 is pivotally connected to the crank arm 82 through a selected bore 84 thereof and the other end of the connecting rod 86 is pivotally connected to a drive disk 88 by a crank pin 90 secured through the corresponding end of the connecting rod 86 and one of a plurality of radial bores 92 formed in the disk 88. The disk 88 is mounted on the output shaft 94 of a speed reduction assembly 96 whose input shaft 98 is driven from the shaft 100 of a variable speed electric motor 102 by an endless flexible belt 104 trained about pulleys 106 and 108 mounted on the shafts 98 and 100.

Of course, as the shaft 100 of the motor 102 rotates, the drive disk 88 rotates at a slower speed and the connecting rod 86 connecting the drive disk 88 with the crank arm 82 causes oscillation of the rollers 18. The cycle frequency of oscillation off the rollers 18 may be adjusted by varying the speed of operation of the motor 102, the phase change speed of oscillation of the rollers may be adjusted by adjusting the pivot connection of the crank arm 86 with the disk 88 along the radial row of bores 92 and the angular extent of oscillation of the rollers 18 may be adjusted by adjustment of the pivot connection between the upper end of the connecting rod 86 to the crank arm 82 along the latter. Further, the relative angulation between the center lines of the effective lever arms defined by the crank arm 82 and the radial line of bores 92 formed in the disk 88 may be adjusted by adjusting the effective length of the connecting rod 86, the latter being in the form of a turn buckle assembly and adjustable by turning the center component 110 thereof relative to the opposite end portions 112 and 114 of the connecting rod 86.

Accordingly, it may be seen that three important aspects of the inverse oscillation of the rollers 18 may be adjusted as desired according to the type of shrimp which is being fed to the upper end of the "nip" area 22. It is pointed out that the shrimp 38 supplied to the funnel 36 will be received from an attendant shrimp splitting machine (not shown) by which the shrimp to be peeled by the unit 10 will be split along their backs prior to being acted upon by the unit 10. This enables larger size shrimp of the 15 to 70 count size to be more effectively peeled and deveined.

The jet spray heads 74 not only serve to facilitate the peeling of the shrimp and the deveining of the shrimp, but also to wash the shrimp free of sand. In addition, those jet spray heads disposed closer to the lower ends of the rollers 18 may be inclined slightly to facilitate movement of the peeled shrimp from the lower ends of the rollers. The lower ends of the rollers are registered with an outlet neck 120 of the unit 10 through which the shelled, deveined and cleaned shrimp are discharged and the trough 62 additionally includes an outlet neck 122 from which the cleaning water, shells, sand and veins may be discharged from the unit 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A shrimp peeling apparatus including a pair of journaled generally horizontal and parallel side-by-side rollers including at least closely adjacent sides defining an elongated upwardly opening "nip" area therebetween, means for supplying successive shrimp to be peeled to one end of said area, drive means operatively connected with said rollers for inversely oscillating the latter, said drive means including adjustment means operative to adjust the angular extent of oscillation of said rollers, the phase change speed of oscillation of said rollers, and the cycle frequency of oscillation of said rollers.

2. The apparatus of claim 1 wherein said adjustment means includes means for adjusting the angular extend of oscillation of said rollers independent of adjustment of the phase change speed of oscillation and the cycle frequency of oscillation of said rollers.

3. The apparatus of claim 1 wherein said adjustment means includes means operative to adjust the phase change speed of oscillation of said rollers independent of adjustment of the angular extent of oscillation of said rollers and the cycle frequency of oscillation of said rollers.

4. The assembly of claim 1 wherein said adjustment means includes means operative to adjust the cycle frequency of oscillation of said rollers independent of the angular extent of oscillation of said rollers and the phase change speed of oscillation of said rollers.

5. The assembly of claim 1 including variable speed driven shrimp engaging means arranged in a row extending along said "nip" area and projecting down into the latter for engaging and urging shrimp along said "nip" area.

6. The assembly of claim 1 including spray heads spaced along said "nip" area and operative to discharge spray jets of water down into said "nip" area for facilitating removal of the shells from shrimp being peeled, deveining the shrimp and washing the shrimp free of sand.

7. The assembly of claim 1 wherein said rollers are downwardly inclined toward the other end of said area.

8. The assembly of claim 1 wherein said drive means includes a crank arm mounted on one end of one of said rollers, an adjustable length connecting rod having one end pivotally connected to said crank arm at a point adjustable therealong, a driven shaft, crank means carried by said driven shaft, the other end of said connecting rod being pivotally connected to said crank means at a point adjustable radially of the axis of rotation of said crank means, and variable speed motor means drivingly connected to said crank means.

9. The assembly of claim 8 including variable speed driven shrimp engaging means arranged in a row extending along said "nip" area and projecting down into the latter for engaging and urging shrimp along said "nip" area.

10. The assembly of claim 9 including spray heads spaced along said "nip" area and operative to discharge spray jets of water down into said "nip" area for facilitating removal of the shells from shrimp being peeled, deveining the shrimp and washing the shrimp free of sand.

* * * * *